United States Patent
Morinaga et al.

(10) Patent No.: US 8,979,126 B2
(45) Date of Patent: Mar. 17, 2015

(54) STEERING APPARATUS FOR VEHICLE

(71) Applicant: Aisin Seiki Kabushiki Kaisha, Kariya (JP)

(72) Inventors: Shinya Morinaga, Chiryu (JP); Yasuaki Kurokawa, Kariya (JP)

(73) Assignee: Aisin Seiki Kabushiki Kaisha, Kariya-shi, Aichi-ken (JP)

( * ) Notice: Subject to any disclaimer, the term of this patent is extended or adjusted under 35 U.S.C. 154(b) by 211 days.

(21) Appl. No.: 13/655,486

(22) Filed: Oct. 19, 2012

(65) Prior Publication Data

US 2013/0098193 A1    Apr. 25, 2013

(30) Foreign Application Priority Data

Oct. 20, 2011    (JP) ................... 2011-230732

(51) Int. Cl.
*B62D 1/18* (2006.01)
*B62D 1/181* (2006.01)

(52) U.S. Cl.
CPC .................... *B62D 1/181* (2013.01)
USPC ............................. 280/775; 74/493

(58) Field of Classification Search
USPC ................... 280/775; 74/493–498
See application file for complete search history.

(56) References Cited

U.S. PATENT DOCUMENTS

| | | | |
|---|---|---|---|
| 4,785,684 A * | 11/1988 | Nishikawa et al. | 74/493 |
| 5,178,411 A | 1/1993 | Fevre et al. | |
| 7,159,904 B2 * | 1/2007 | Schafer et al. | 280/775 |
| 7,216,562 B2 * | 5/2007 | Muller | 74/493 |
| 7,410,190 B2 * | 8/2008 | Sawada et al. | 280/777 |
| 8,650,983 B2 * | 2/2014 | Mizuno et al. | 74/496 |
| 2005/0161930 A1 | 7/2005 | Schafer et al. | |
| 2007/0225883 A1 | 9/2007 | Maeda et al. | |

FOREIGN PATENT DOCUMENTS

| | | |
|---|---|---|
| DE | 691 09 541 T2 | 9/1995 |
| EP | 1583680 B1 | 7/2006 |
| EP | 1 839 993 A2 | 10/2007 |
| GB | 2 304 865 A | 3/1997 |
| JP | 63-087366 A | 4/1988 |

OTHER PUBLICATIONS

Extended European Search Report dated Sep. 4, 2013, issued by the European Patent Office in the corresponding European Application No. 12189247.5. (6 pages).

* cited by examiner

*Primary Examiner* — Faye M. Fleming
(74) *Attorney, Agent, or Firm* — Buchanan Ingersoll & Rooney PC

(57) ABSTRACT

A steering apparatus for a vehicle, includes: a steering column; a single electric motor being selectively connected to a telescopic mechanism or a tilt mechanism; a steering wheel; a drive mechanism transmitting an output torque of the electric motor to a telescopic threaded shaft and a tilt threaded shaft; and a connecting-disconnecting mechanism having a first clutch mechanism connecting and disconnecting the drive mechanism to and from the tilt threaded shaft and a second clutch mechanism connecting and disconnecting the drive mechanism to and from the telescopic threaded shaft, the connecting-disconnecting mechanism bringing one of the first clutch mechanism and the second clutch mechanism in a connected state to the drive mechanism and bringing the other of the first clutch mechanism and the second clutch mechanism in a disconnected state from the drive mechanism, wherein the drive mechanism and the connecting-disconnecting mechanism constitute a single power connecting-disconnecting unit.

5 Claims, 10 Drawing Sheets

STEERING APPARATUS FOR VEHICLE

CROSS REFERENCE TO RELATED APPLICATIONS

This application is based on and claims priority under 35 U.S.C. §119 to Japanese Patent Application 2011-230732, filed on Oct. 20, 2011, the entire content of which is incorporated herein by reference.

TECHNICAL FIELD

This disclosure generally relates to a steering apparatus for a vehicle.

BACKGROUND DISCUSSION

A known steering apparatus (a steering column for a motor vehicle) is disclosed in EP1583680B (which will be referred to as Reference 1). The steering apparatus including a switching device and an electric drive unit (a motor) is configured so that the switching device switches the steering column from a tilt operation to a telescopic operation and vice versa by means of a driving force of the single motor. As a result, according to the steering apparatus disclosed in Reference 1, adjustment of both the tilt operation and the telescopic operation may be realized by the single motor. In Reference 1, the driving force of the motor is outputted via a speed reducer to rotate a spindle (an external thread). In addition, the steering apparatus of Reference 1 is provided with two nuts (internal threads) consistently meshing with the spindle. The nuts are connected to a tilt link and a telescopic link, respectively. Each of the nuts is provided with a locking mechanism. Accordingly, in a case where the locking mechanism is in a locked state, the nut is restricted from rotating relative to the spindle; therefore, the nut moves in an axial direction of the spindle in accordance with the rotation of the spindle. In other words, the nut connected to the tilt link moves in the axial direction; thereby, the tilt operation of the steering column is performed. Meanwhile, the nut connected to the telescopic link moves in the axial direction; thereby, the telescopic operation of the steering column is performed. In a case where the locking mechanism is in a non-locked state, the nut idly rotates relative to the spindle; therefore, the tilt or telescopic operation of the steering column is not performed. According to the steering apparatus disclosed in Reference 1, an electromagnetic brake, an eddy-current brake, or retraction and extraction of a lock pin by use of a solenoid may serve as the locking mechanism.

As described above, the steering apparatus according to Reference 1 is provided with the single motor; however, the lock mechanisms are required for the nuts connected to the tilt link and the telescopic link, respectively. Accordingly, costs for the steering apparatus, the number of components of the steering apparatus, and the weight thereof may not be reduced. In addition, the nuts are arranged in series with each other in the axial direction. Therefore, an entire length of the steering column in the axial direction is restricted from being minimized. Consequently, assemblability of the steering apparatus to the motor vehicle may decrease.

A need thus exists for a steering apparatus for a vehicle, which is not susceptible to the drawbacks mentioned above.

SUMMARY

According to an aspect of this disclosure, a steering apparatus for vehicle includes a steering column supported by a vehicle body to be slidable in a font-rear direction of the vehicle and being pivotal relative to the vehicle body, a single electric motor configured to be selectively connected to a telescopic mechanism or a tilt mechanism, a steering wheel of which an operation position is adjustable by an operation of the telescopic mechanism or the tilt mechanism, a drive mechanism adjusting an output torque of the electric motor to transmit the output torque to a telescopic threaded shaft and a tilt threaded shaft, the telescopic threaded shaft being configured to drive the telescopic mechanism, the tilt threaded shaft being configured to drive the tilt mechanism and arranged in parallel with the telescopic threaded shaft, and a connecting-disconnecting mechanism including a first clutch mechanism configured to connect and disconnect the drive mechanism to and from the tilt threaded shaft, and a second clutch mechanism configured to connect and disconnect the drive mechanism to and from the telescopic threaded shaft, the connecting-disconnecting mechanism bringing one of the first clutch mechanism and the second clutch mechanism in a connected state to the drive mechanism and bringing the other of the first clutch mechanism and the second clutch mechanism in a disconnected state from the drive mechanism, wherein the drive mechanism and the connecting-disconnecting mechanism constitute a single power connecting-disconnecting unit.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
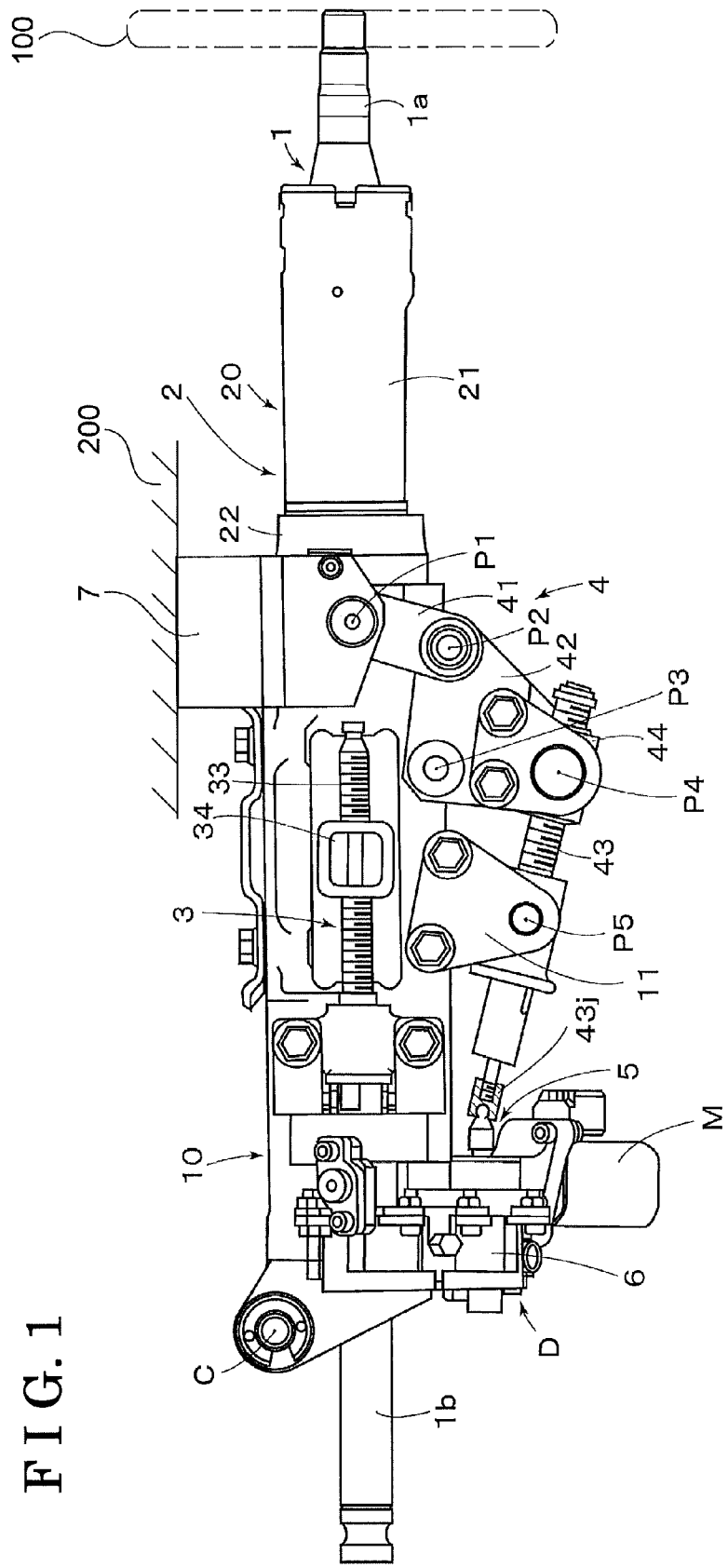
FIG. 1 is a side view of a steering apparatus according to an embodiment disclosed here.
Figure 2:
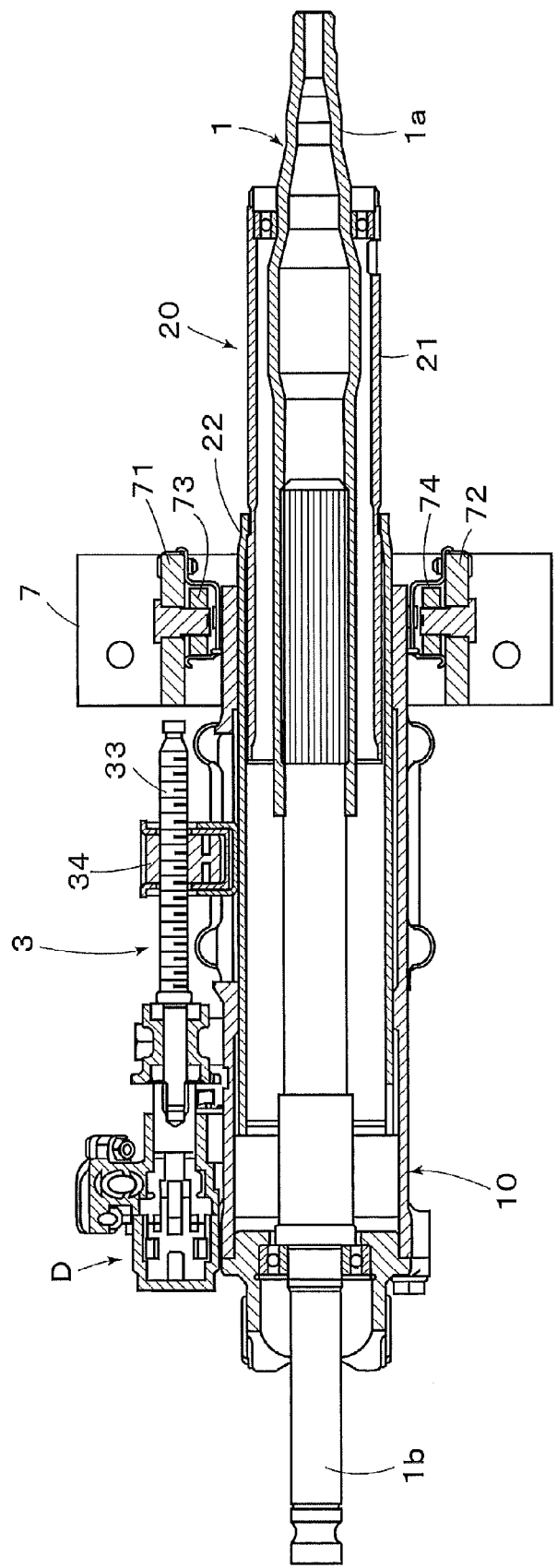
FIG. 2 is a horizontal sectional view of the steering apparatus according to the embodiment disclosed here.

A steering apparatus for a vehicle according to an embodiment will be described as follows with reference to the attached drawings. In the following embodiment, directions and orientations such as left, right, front, rear, top, and bottom correspond to those of the vehicle. FIGS. 1 and 2 illustrate an overall configuration of the steering apparatus according to the embodiment. A steering column 2 is supported by a vehicle body 200 of the vehicle so as to move in a front-rear direction of the vehicle and so as to pivot relative to the vehicle body 200. In addition, a single electric motor M (which will be hereinafter simply referred to as a motor M) is configured to be selectively connected to a telescopic mechanism 3 or a tilt mechanism 4 by a power connecting-disconnecting unit D arranged at a front side of the vehicle. According to the steering apparatus of the embodiment, an operation position of a steering wheel 100 may be adjusted by an operation of the telescopic mechanism 3 or the tilt mechanism 4. As illustrated in FIG. 2, the steering apparatus includes a steering shaft 1 including an upper shaft 1a formed in a tubular form and a lower shaft 1b that is spline-fitted to a front end portion of the upper shaft 1a. The steering wheel 100 is connected to a rear end portion of the upper shaft 1a. In other words, the upper shaft 1a and the lower shaft 1b are connected to each other so as to move relative to each other in an axial direction thereof. A front end portion of the lower shaft 1b is connected to a steering mechanism. The steering mechanism is driven to turn angles of vehicle wheels via a wheel steering mechanism in response to an operation of the steering wheel 100.

A main housing 10 is coaxially arranged with the steering shaft 1. The main housing 10 is supported by a pivot C so as to rotate thereabout relative to the vehicle body 200 and is retained by a fixing bracket 7. The fixing bracket 7 includes a pair of retaining portions 71, 72 facing each other and extending in a downward direction of the vehicle. The main housing 10 is arranged and retained between the retaining portions 71, 72 and an upper portion of the main housing 10 is fixed to the vehicle body 200 (see in FIG. 1). In addition, as illustrated in FIG. 2, thrust mechanisms 73, 74 are arranged respectively between the main housing 10 and the retaining portion 71 of the fixing bracket 7 and between the main housing 10 and the retaining portion 72 of the fixing bracket 7. Thus, the main housing 10 is slidably supported by the thrust mechanisms 73, 74 relative to the fixing bracket 7.

A movable column member 20 is retained within the main housing 10 so as to move in the axial direction, i.e, the front-rear direction of the vehicle. The movable column member 20 includes an inner tube 21 and an outer tube 22. The inner tube 21 accommodates the steering shaft 1 and supports the steering shaft 1 so that the steering shaft 1 rotates about an axis thereof. The outer tube 22 accommodates the inner tube 21 and consistently retains the inner tube 21 at a predetermined position. The inner tube 21 is referred to as an upper tube and the outer tube 22 is referred to as a telescopic tube. The upper shaft 1a is rotatably supported via a bearing by a rear end portion of the inner tube 21. A movement of the upper shaft 1a relative to the inner tube 21 in the axial direction is restricted; thereby, the upper shaft 1a and the inner tube 21 are configured to move integrally with each other in the axial direction. In addition, a telescopic threaded shaft 33 formed by a trapezoidal thread (an external thread) is supported via a bearing by the main housing 10. A nut member 34 engageable with the telescopic threaded shaft 33 and movable in the axial direction is fixed to the outer tube 22. The nut member 34 moves in the axial direction in accordance with rotation of the telescopic threaded shaft 33 around an axis thereof; therefore, the outer tube 22 moves in the front-rear direction of the vehicle.

Thus, the outer tube 22, the inner tube 21, the steering shaft 1, and the steering wheel 100 are integrally movable in the axial direction relative to the main housing 10, therefore configuring the telescopic mechanism 3. Consequently, the steering wheel 100 may be adjusted to an intended position in the front-rear direction of the vehicle. In addition, for example, in a case where a load equal to or greater than a predetermined value is applied to the steering shaft 1, the inner tube 21 is allowed to move relative to the outer tube 22 in the axial direction (the inner tube 21 and the upper shaft 1a are allowed to move relative to the outer tube 22 in the axial direction). In other words, the inner tube 21 and the outer tube 22 according to the embodiment function as an energy absorbing means together with an annular frictional member, for example, a resilient bush made of metal, or the like that is placed between the inner tube 21 and the outer tube 22.

Moreover, according to the steering apparatus of the embodiment, as illustrated in FIG. 1, an upper end portion of a link member 41 is positioned at a lower side of each of the retaining portions 71, 72 of the fixing bracket 7 so as to be supported thereby and so as to rotate about a pivot shaft P1. A lower end portion of the link member 41 is supported by a link member 42 so as to rotate about a pivot shaft P2. The link member 42 is positioned at a lower side of the main housing 10 and is supported thereby so as to rotate about a pivot shaft P3. Furthermore, a nut member 44 is supported by the link member 42 so as to rotate about a pivot shaft P4. The nut member 44 is configured to mesh with a tilt threaded shaft 43 formed by a trapezoidal thread (an external thread), therefore being referred to as a tilt nut or a tilt slider. The tilt threaded shaft 43 is supported by a support member 11, which is fixed to the main housing 10, so as to rotate about a pivot shaft P5. The tilt threaded shaft 43 is arranged substantially in parallel with the telescopic threaded shaft 33 in the front-rear direction of the vehicle.

For example, the nut member 44 moves in an axial direction of the tilt threaded shaft 43 in accordance with rotation of the tilt threaded shaft 43 (about an axis thereof). Therefore, the link member 42 rotates about the pivot shaft P3 and the link member 41 rotates about the pivot shaft P1. Consequently, the main housing 10 (including the outer tube 22, the inner tube 21, the upper shaft 1a, and the steering wheel 100) moves in the vertical direction of the vehicle; thereby, the tilt mechanism 4 is configured.

Figure 3:
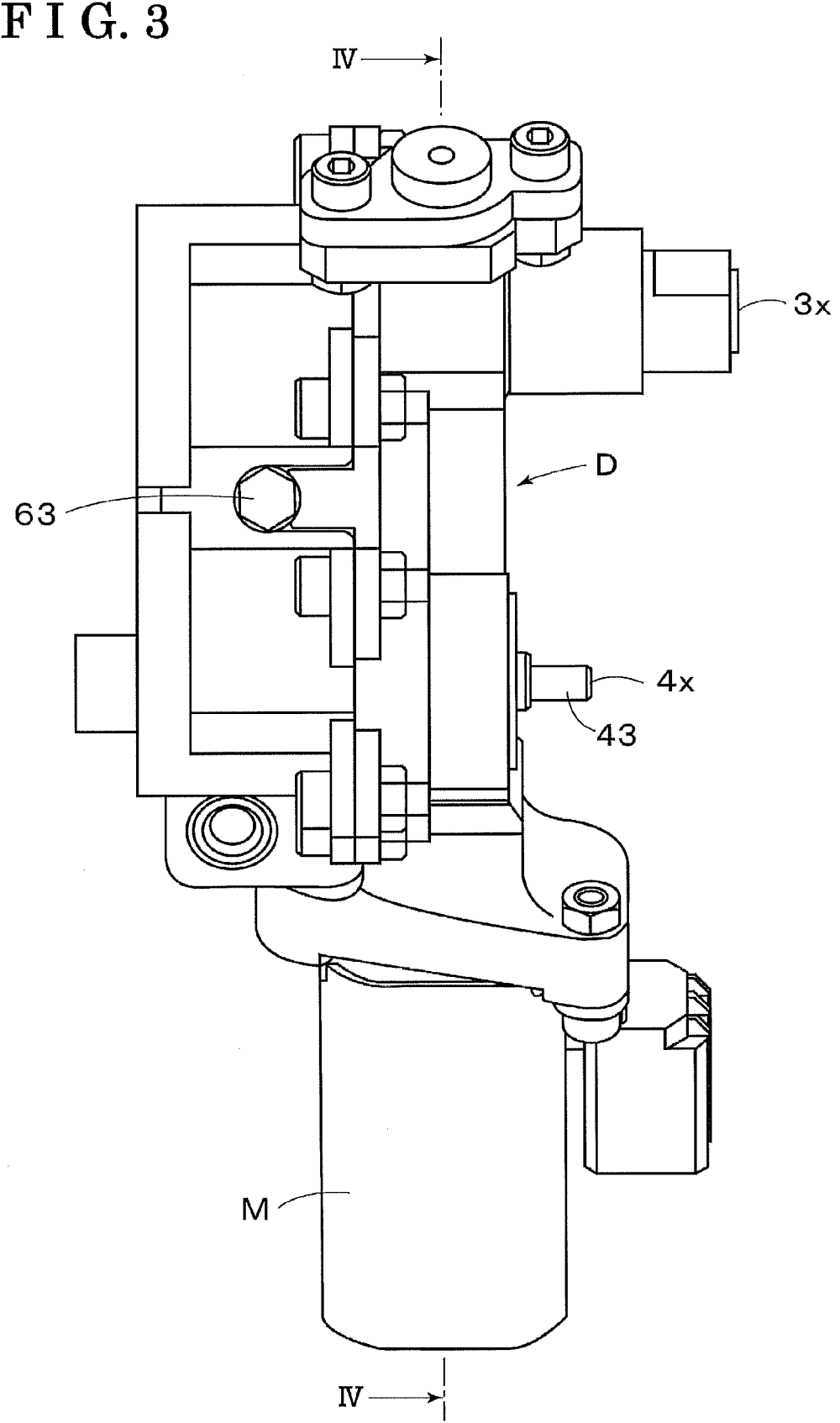
FIG. 3 is a side view of an enlarged portion of a connecting-disconnecting mechanism according to the embodiment disclosed here.
Figure 4:
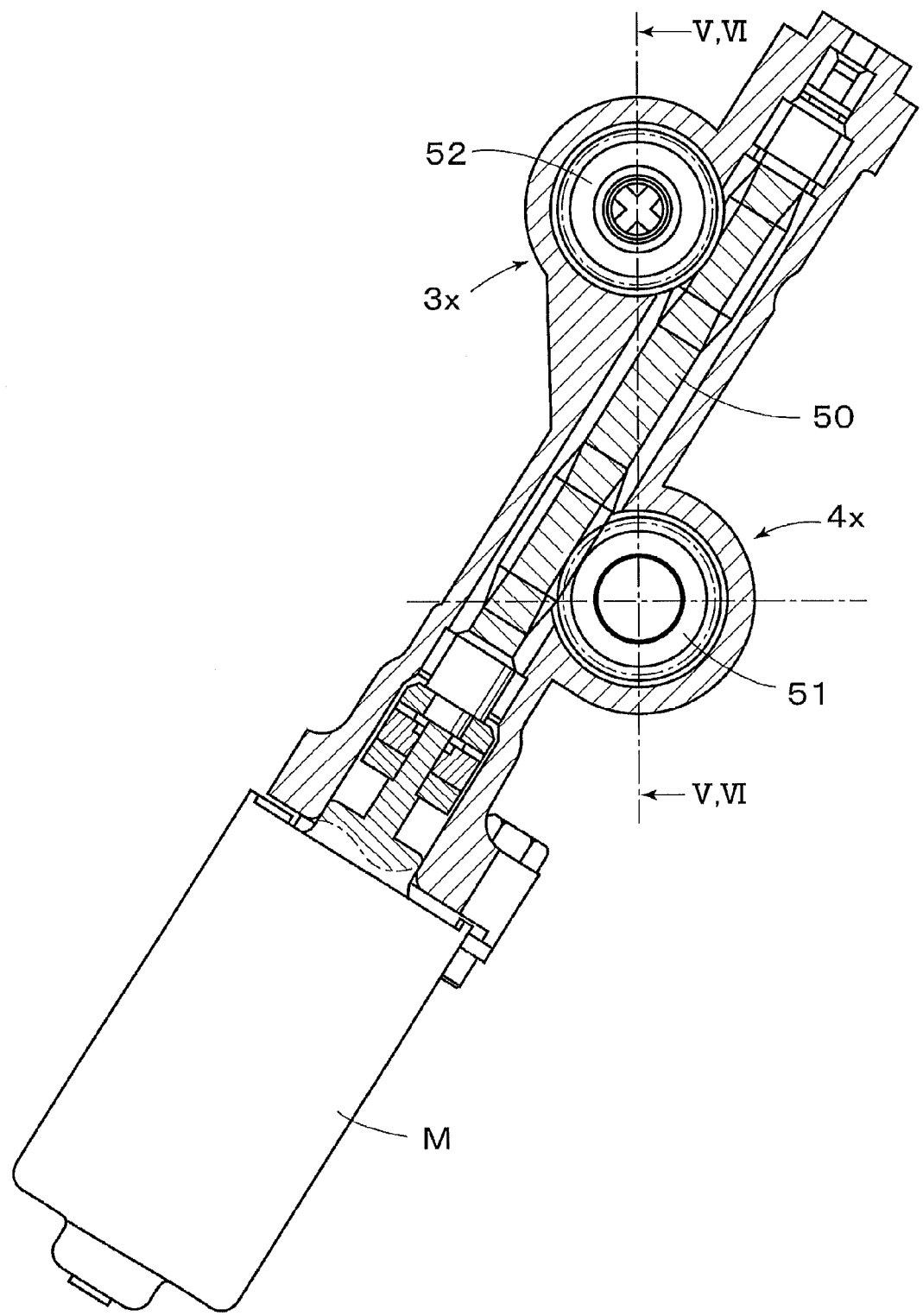
FIG. 4 is a cross sectional view taken along the line IV-IV of FIG. 3 and illustrating an enlarged portion of a drive mechanism according to the embodiment disclosed here.
Figure 5:
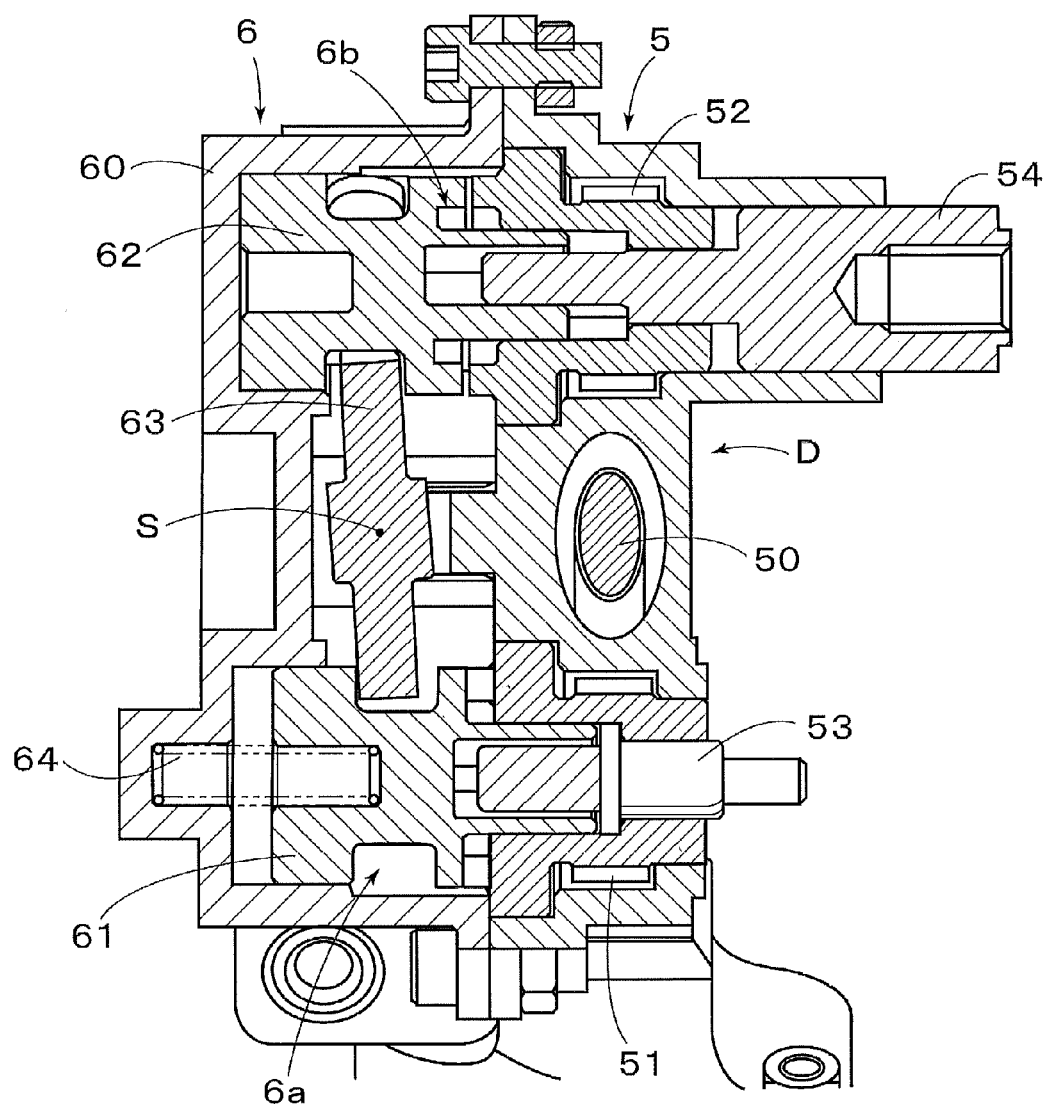
FIG. 5 is a cross sectional view taken along the line V-V of FIG. 4 and illustrating an enlarged portion of the connecting-disconnecting mechanism in a condition where the drive mechanism is shifted to a connected state to a tilt mechanism in the embodiment disclosed here.
Figure 8:
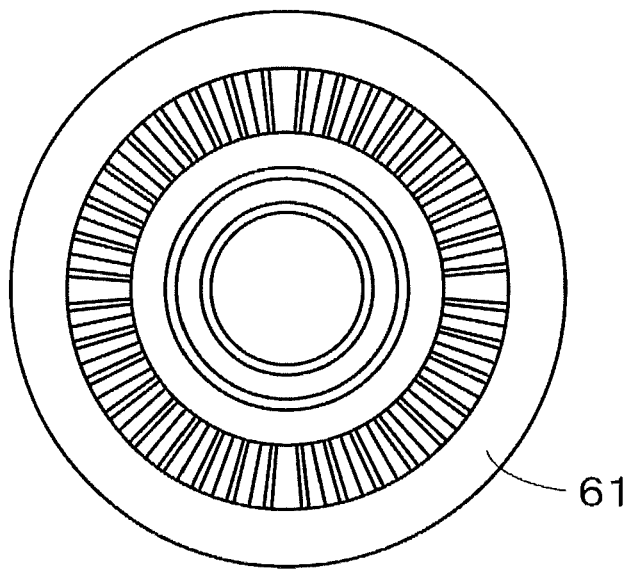
FIG. 8 is a front view illustrating an enlarged portion of a first clutch member according to the embodiment disclosed here.
Figure 9:
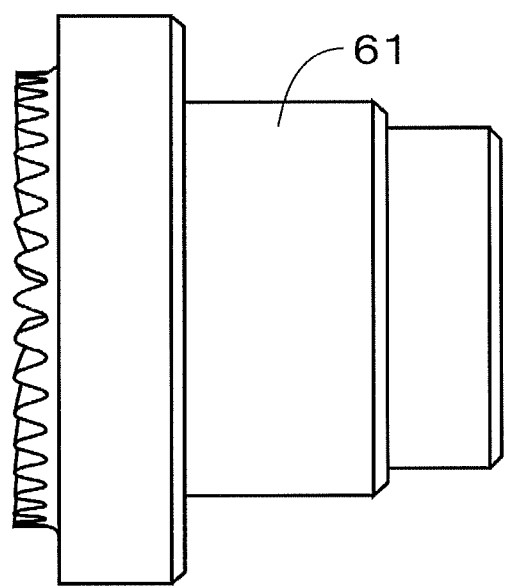
FIG. 9 is a side view illustrating an enlarged portion of the first clutch member according to the embodiment disclosed here.

The steering apparatus according to the embodiment includes a drive mechanism 5 and a connecting-disconnecting mechanism 6 that are accommodated in the power connecting-disconnecting unit D. The drive mechanism 5 selectively drives the telescopic mechanism 3 and the tilt mechanism 4. FIGS. 3 to 5 illustrate configurations of the drive mechanism 5 and the connecting-disconnecting mechanism 6. As illustrated in FIGS. 3 and 4, the motor M is arranged at a lower side of the power connecting-disconnecting unit D and a tilt output portion 3x and a telescopic output portion 4x are arranged in a direction perpendicular to an output shaft (corresponding to a worm shaft 50) of the motor M. Further, as illustrated in FIG. 5, first and second worm wheels 51 and 52 are arranged in a housing 60 configuring the power connecting-disconnecting unit D. The first and second worm wheels 51 and 52 are rotatably supported by the housing 60 therein so as to engage with the worm shaft 50 of the motor M. Furthermore, the first and second worm wheels 51 and 52 are provided so as to engage with and disengage from first and second clutch members 61 and 62, respectively; thereby, first and second clutch mechanisms 6a and 6b are configured. As illustrated in FIGS. 8 and 9, one end surface of the first clutch member 61 (the second clutch member 62) is formed to have tooth faces. Likewise, one end surface of the first worm wheel 51 (the second worm wheel 52) is formed to have tooth faces. In addition, the first clutch member 61 and the first worm wheel 51 (the second clutch member 62 and the second worm wheel 52) are arranged so as to engage with each other.

In FIG. 5, the first clutch member 61 is connected via a fitting means (for example, a cross-shaped connecting portion) to a connecting member 53 so as to slide relative thereto and integrally rotate therewith. The connecting member 53 is connected via a universal joint 43j (illustrated in FIG. 1) to the tilt threaded shaft 43. Meanwhile, the second clutch member 62 is connected via a fitting means (for example, a cross-shaped connecting portion) to a connecting member 54 so as to slide relative thereto and integrally rotate therewith. The connecting member 54 is directly connected to the telescopic threaded shaft 33. In addition, the first worm wheel 51 and the second worm wheel 52 are rotatably supported by the connecting members 53 and 54, respectively. According to the embodiment, the first clutch member 61 is connected via the fitting means to the connecting member 53 and the second clutch member 62 is connected via the fitting means to the connecting member 54. Alternatively, the first clutch member 61 and the second clutch member 62 may be spline-fitted to the connecting members 53 and 54, respectively. Moreover, the connection between the telescopic threaded shaft 33 and the connecting member 54 and the connection between the tilt threaded shaft 43 and the connecting member 53 may be established by fixing members, for example, threaded portions or other members, as long as rotation torque of the motor M may be transmitted to the telescopic threaded shaft 33 and the tilt threaded shaft 43. Alternatively, the connecting member 54 may be flexibly connected to the telescopic threaded shaft 33 by a universal joint, a torque cable, or the like and the connecting member 53 may be flexibly connected to the tilt threaded shaft 43 by a universal joint, a torque cable, or the like.

According to the embodiment, a speed reduction mechanism relative to the telescopic threaded shaft 33 and the tilt threaded shaft 43 is configured by the first worm wheel 51, the second worm wheel 52, and the worm shaft 50 of the motor M. Thus, output torque (rotation torque or power) of the motor M is appropriately adjusted by the speed reduction mechanism to be therefore transmitted to the telescopic mechanism 3 and the tilt mechanism 4. In addition, for example, in a case where the first clutch member 61 moves axially (toward the right side in FIG. 5, or in a predetermined direction) and is thereafter engaged with the first worm wheel 51, the worm shaft 50 is connected via the first worm wheel 51, the first clutch member 61, the connecting member 53, and the universal joint 43j to the tilt threaded shaft 43. Therefore, the tilt mechanism 4 is driven by the motor M. At this time, the second clutch member 62 is disconnected from the second worm wheel 52 and thus the second worm wheel 52 idly rotates relative to the second clutch member 62. Meanwhile, for example, in a case where the second clutch member 62 moves axially (toward the right side in FIG. 5, or in the predetermined direction) and is thereafter engaged with the second worm wheel 52, the worm shaft 50 is connected via the second worm wheel 52, the second clutch member 62, and the connecting member 54 to the telescopic threaded shaft 33. Therefore, the telescopic mechanism 3 is driven by the motor M. At this time, the first clutch member 61 is disconnected from the first worm wheel 51 and thus the first worm wheel 51 idly rotates relative to the first clutch member 61.

Figure 10:
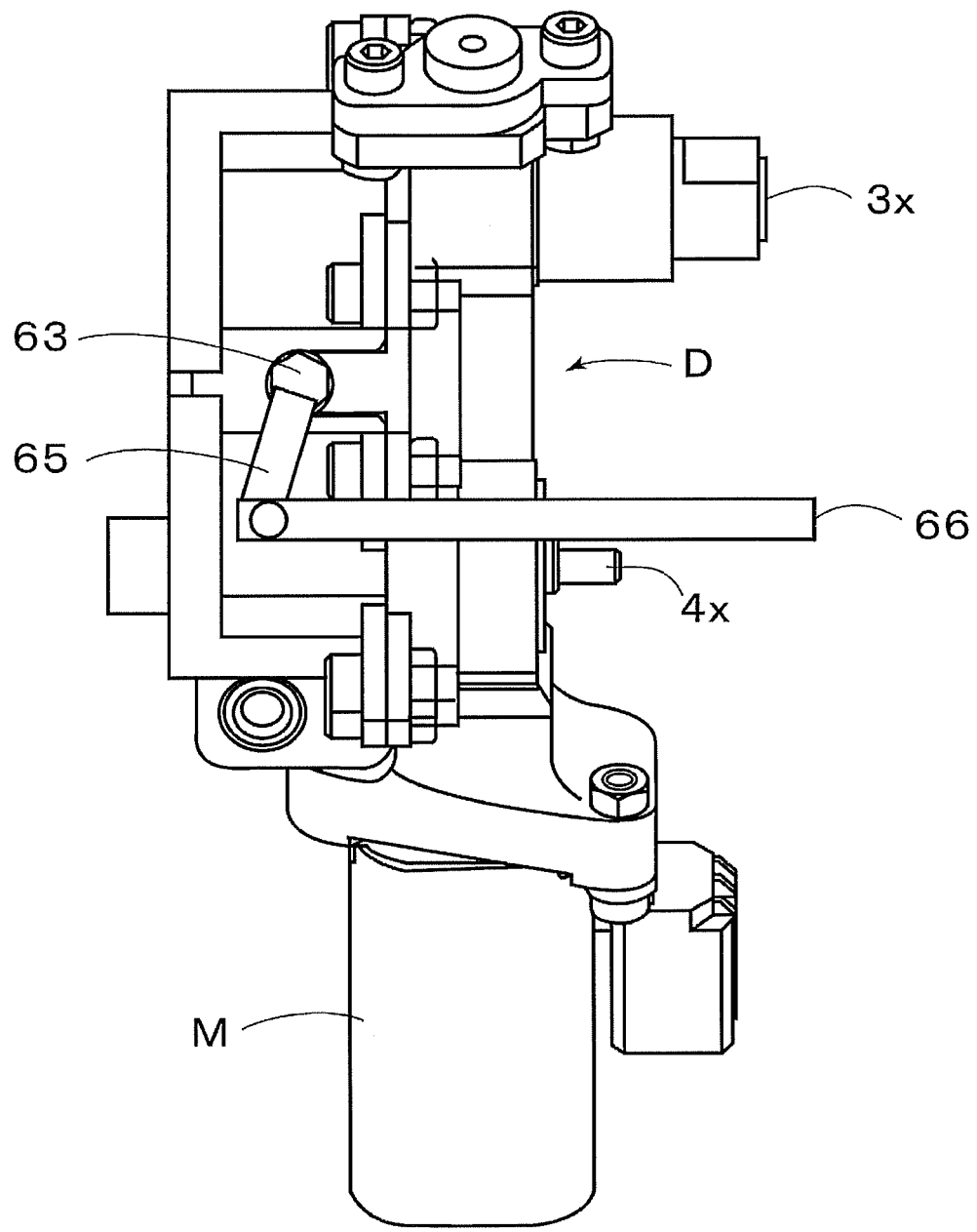
FIG. 10 is a side view illustrating an enlarged portion of a manual operation mechanism and the connecting-disconnecting mechanism in the embodiment disclosed here.

According to the steering apparatus of the embodiment, a lever member 63 is utilized as a connecting-disconnecting member for the first clutch mechanism 6a and the second clutch mechanism 6b. As illustrated in FIG. 5, an intermediate portion of the lever member 63 is pivotally supported within the power connecting-disconnecting unit D (the lever member 63 is arranged in the power connecting-disconnecting unit D so as to pivot about a point S). The lever member 63 is arranged so that first and second end portions thereof may engage with the first clutch member 61 and the second clutch member 62, respectively. The connecting-disconnecting mechanism 6 is provided with a manual operation mechanism. In other words, as illustrated in FIG. 10, the lever member 63 is connected via a link 65 to an operation lever 66. The operation lever 66 is manually operated by a user or a driver of the vehicle to rotate the lever member 63.

Further, as illustrated in FIG. 5, a compression spring 64 serving as a biasing member is arranged in the power connecting-disconnecting unit D. In a normal state, the first clutch member 61 is biased by a biasing force of the compression spring 64 so as to be engaged with the first worm wheel 51, thereby being in a connected state to the first worm wheel 51. At this time, the second clutch member 62 is disconnected from the second worm wheel 52 and thus the second worm wheel 52 idly rotates relative to the second clutch member 62. Accordingly, the rotation torque of the worm shaft 50 of the motor M is not transmitted to the telescopic mechanism 3. Consequently, only when necessary, the lever member 63 is manually rotated to thereby bring the second clutch member 62 into engaged and connected states with the second worm wheel 52. At this time, the first worm wheel 51 is disconnected from the first clutch member 61, therefore idly rotating relative to the first clutch member 61.

For example, in a state where the lever member 63 is in an initial position illustrated in FIG. 5, the first clutch member 61 is maintained in the connected state to the first worm wheel 51; therefore, the tilt mechanism 4 may be operated. On the other hand, for example, in a sate where the lever member 63 is manually rotated, the first clutch member 61 is driven against the biasing force of the compression spring 64 and therefore moves axially (toward the left side in FIG. 5, or in an opposite direction from the predetermine direction). Accordingly, the first clutch member 61 is disengaged from the first worm wheel 51; therefore, the second clutch member 62 is brought in the engaged state with the second worm wheel 52. Consequently, the telescopic mechanism 3 may be operated.

An overall operation of the steering apparatus configured as described above will be explained as follows. When the steering apparatus is in a normal state, the connecting-disconnecting mechanism 6 is in the condition illustrated in FIG. 5. At this time, the first worm wheel 51 is connected via the first clutch member 61 to the tilt mechanism 4; therefore, in such condition, the motor M is driven to output the rotation torque via the worm shaft 50 and the first worm wheel 51 to the tilt mechanism 4. In particular, the rotation torque (power) from the motor M is adjusted by the worm shaft 50 and the first worm wheel 51 to be therefore transmitted to the tilt mechanism 4; thus, the tilt mechanism 4 is driven. Thereafter, the motor M is stopped; therefore, the steering wheel 100 is retained at a desired position (a tilt position) in the vertical direction of the vehicle. Afterward, the lever member 63 is manually rotated; thereby, the second clutch member 62 is brought in the engaged state with the second worm wheel 52. Accordingly, the first clutch member 61 is disengaged from the first worm wheel 51. Consequently, the connecting-disconnecting mechanism 6 in the connected state to the tilt mechanism 4 is shifted to a connected state to the telescopic mechanism 3. Therefore, in such condition, the motor M is driven to output the rotation torque via the worm shaft 50 and the second worm wheel 52 to the telescopic mechanism 3. In particular, the rotation torque from the motor M is adjusted by the worm shaft 50 and the second worm wheel 52 to be therefore transmitted to the telescopic mechanism 3; thus, the telescopic mechanism 3 is driven. Thereafter, the motor M is stopped; therefore, the steering wheel 100 is retained at a desired position (a telescopic position) in the front-rear direction of the vehicle.

As described above, according to the steering apparatus of the embodiment, in a state where the lever member 63 is in the initial position, the connecting-disconnecting mechanism 6 is connected via the first clutch mechanism 6a to the tilt mechanism 4. At this time, the motor M is driven to therefore operate the tilt mechanism 4. As a result, the steering wheel 100 may be moved upward and downward in the vertical direction of the vehicle. In addition, the lever member 63 is only manually rotated; thereby, the connecting-disconnecting mechanism 6 in the connected state to the tilt mechanism 4 may shift to the connected state to the telescopic mechanism 3; thereafter, in such condition, the motor M is driven. Consequently, the telescopic mechanism 3 is brought into operation via the second clutch mechanism 6b; therefore, the steering wheel 100 may be moved forward and rearward in the front-rear direction of the vehicle.

Figures 6, 7:
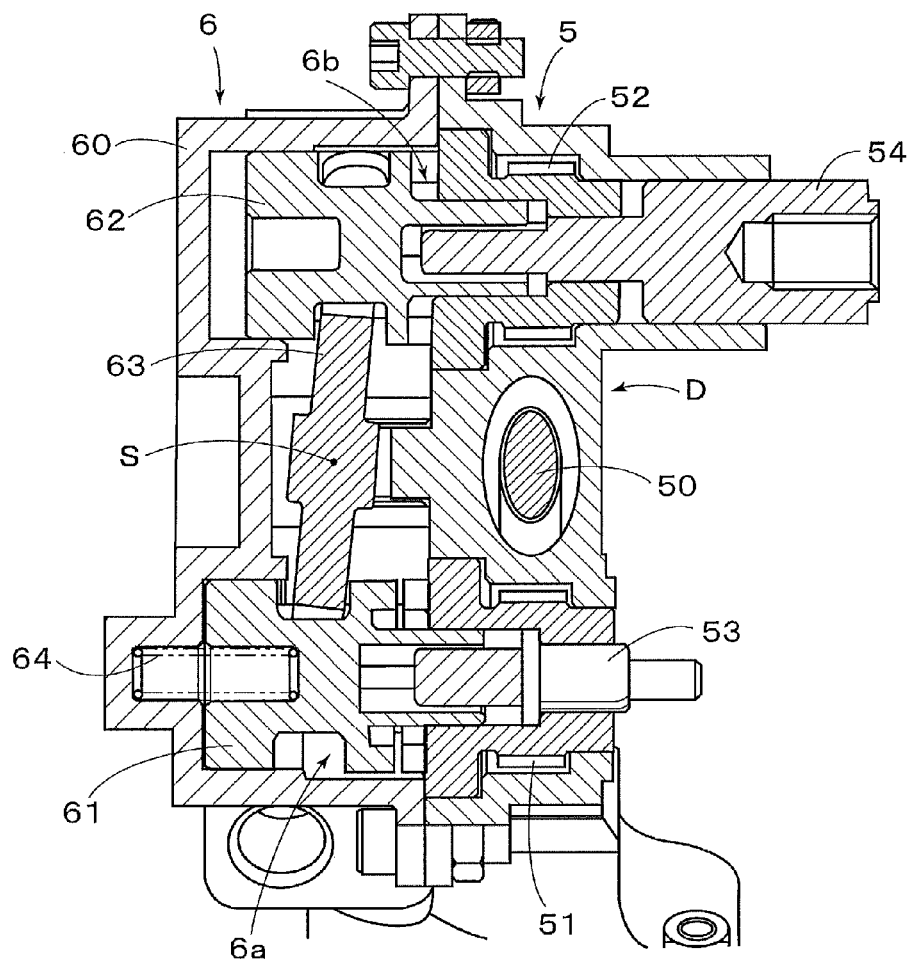
FIG. 6 is a cross sectional view taken along the line VI-VI of FIG. 4 and illustrating an enlarged portion of the connecting-disconnecting mechanism in a condition where the drive mechanism is shifted to a connected state to a telescopic mechanism in the embodiment disclosed here.
FIG. 7 is a vertical sectional view illustrating an enlarged portion of a support portion for supporting a tilt threaded shaft in the embodiment disclosed here.

According to the steering apparatus of the embodiment, either one of the telescopic mechanism 3 and the tilt mechanism 4 is, or both the telescopic mechanism 3 and the tilt mechanism 4 are utilized in an electrically separated manner from the motor M. Therefore, in order to restrict a telescopic or tilt position of the steering wheel 100 from being shifted by a external force applied to the steering wheel 100, it is appropriate that a rotational load is applied to the telescopic threaded shaft 33 or the tilt threaded shaft 43 as necessary. For example, even in a case were a braking effect by cogging torque of the motor M may not be obtained, a bush 35 is arranged at the telescopic threaded shaft 33 as illustrated in FIG. 7. Therefore, the shifting of the telescopic or tilt position caused by the aforementioned load acting in the opposite direction may be restricted. In addition, the bush 35 or another means (an oil seal, a dust seal, or the like) may be applied as a means to apply a rotational load to the telescopic threaded shaft 33 or the tilt threaded shaft 43.

Figure 11:
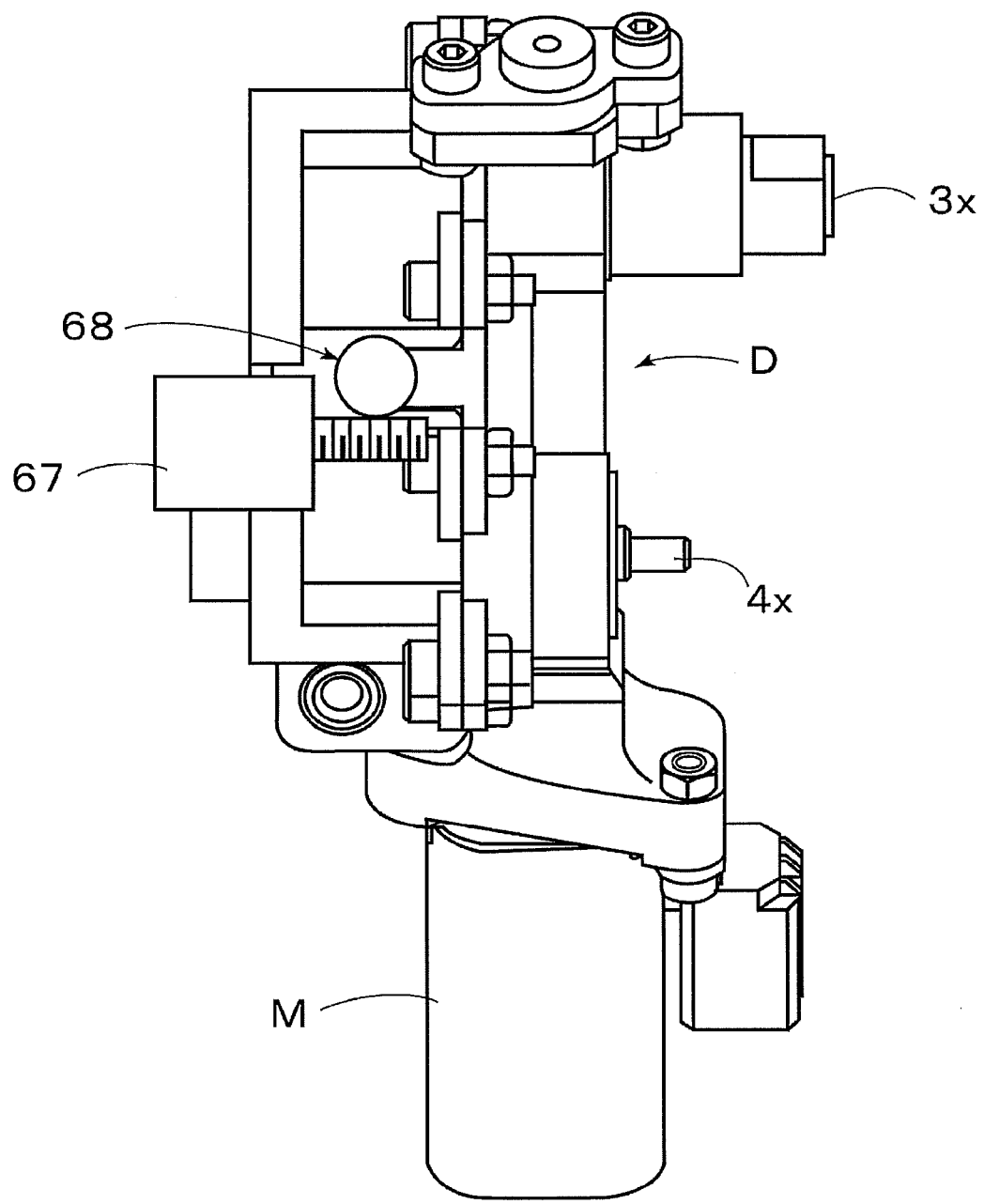
FIG. 11 is a side view illustrating an enlarged portion of an electrical operation mechanism and the connecting-disconnecting mechanism in a first modified example of the embodiment disclosed here.

According to the embodiment, the connecting-disconnecting mechanism 6 is provided with the manual operation mechanism (see FIG. 10). Alternatively, according to a first modified example of the embodiment as illustrated in FIG. 11, an electric motor 67 and a speed reduction mechanism 68, or a solenoid may be applied as an electrical operation mechanism to electrically rotate the lever member 63. In such case where the connecting-disconnecting mechanism 6 is provided with the electrical operation mechanism, the steering apparatus is controlled as follows by means of an electric control unit (ECU). For example, in a state where the lever member 63 is normally set in a tilt operation position to initiate the tilt operation, an operation button for performing the tilt operation is pressed by a user or a driver of the vehicle, or an auto-away/auto-return operation for automatically changing a position of the steering wheel 100 relative to the driver or user is conducted at the time of starting or stopping of an engine. In such case, the electric motor 67 for shifting a position of the lever member 63 is configured so as not to start. On the other hand, for example, when the user or driver presses an operation button for performing the telescopic operation, the electric motor 67 is firstly driven to rotate the lever member 63 via the speed reduction mechanism 68 toward a telescopic operation position (the telescopic mechanism 3). Thereafter, the aforementioned motor M is activated while the lever member 63 is maintained in the telescopic operation position; therefore, the position of the steering wheel 100 becomes adjustable in the longitudinal direction of the vehicle. After the steering wheel 100 is adjusted to a desired telescopic position, energization to the electric motor 67 is stopped; thereby, the lever member 63 is returned to the tilt operation position (toward the tilt mechanism 4) by the biasing force of the compression spring 64.

Figure 12:
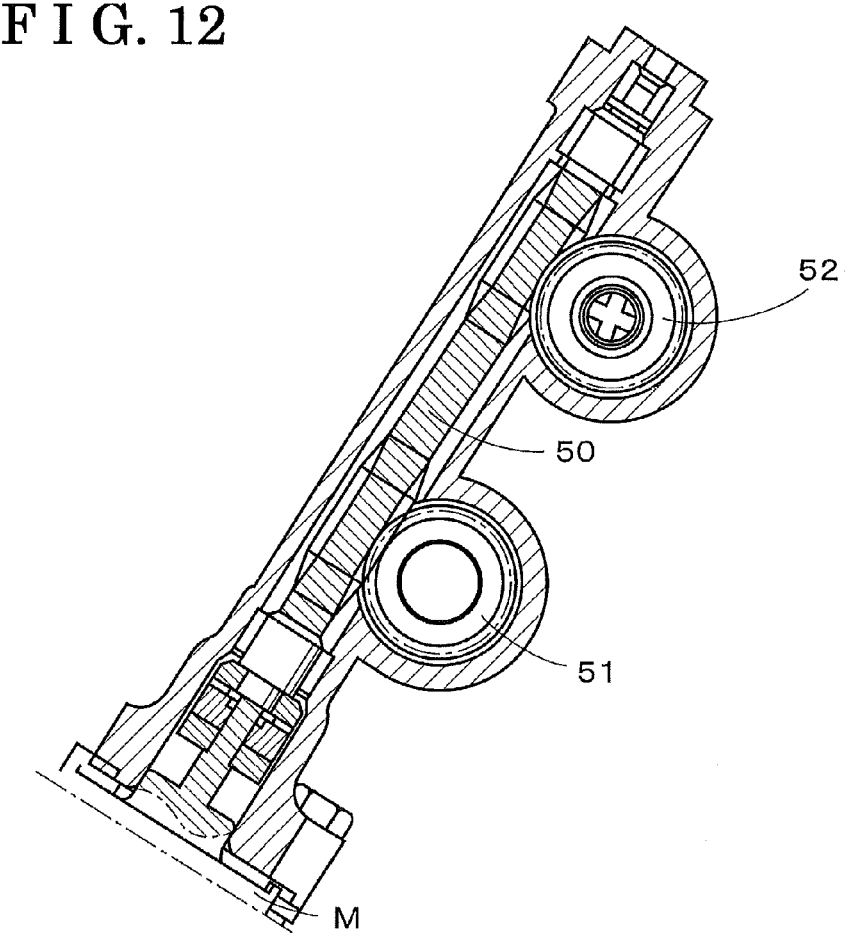
FIG. 12 is a cross sectional view illustrating an enlarged portion of the drive mechanism according to a second modified example of the embodiment disclosed here.
Figure 13:
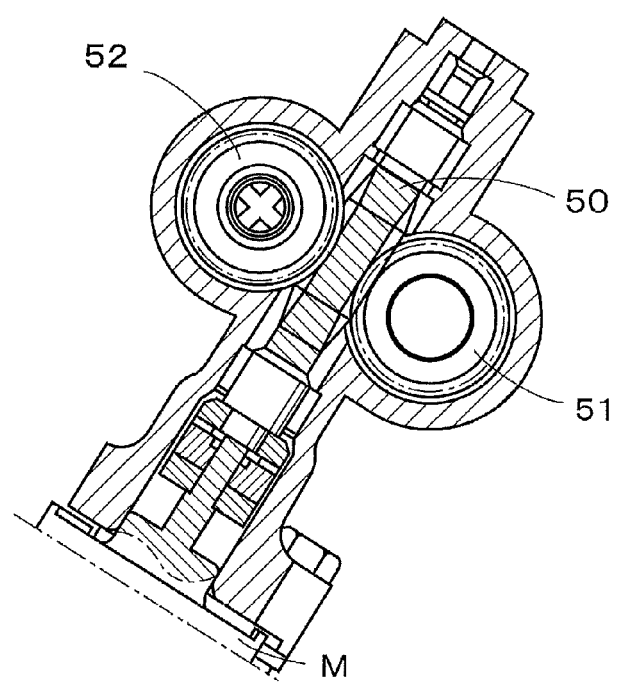
FIG. 13 is a cross sectional view illustrating an enlarged portion of the drive mechanism according to a third modified example of the embodiment disclosed here.

In addition, in a second modified example of the embodiment, the drive mechanism 5 is modified from the arrangement of the first and second worm wheels 51 and 52 as illustrated in FIG. 4 to the arrangement thereof as illustrated in FIG. 12. According to the second modified example of the embodiment, the first and second worm wheels 51 and 52 are arranged at one side (the right side in FIG. 12) relative to the worm shaft 50. For example, in a case where a component desired not to make contact with other components is being positioned at the other side (the left side in FIG. 12) relative to the worm shaft 50, it is appropriate for the first and second worm wheels 51 and 52 to be configured as in FIG. 12. Alternatively, in a third modified example of the embodiment, as illustrated in FIG. 13, the first and second worm wheels 51 and 52 are arranged so as to face each other in a state where the worm shaft 50 is arranged between the first and second worm wheels 51 and 52. Therefore, an entire length of the worm shaft 50 may be reduced. As a result, the steering apparatus according to the third modified example of the embodiment may be further downsized in accordance with the arrangement of the drive mechanism 5.

As described above, according to the aforementioned embodiment, the steering column 2 supported by the vehicle body 200 to be slidable in the font-rear direction of the vehicle and being pivotal relative to the vehicle body 200, the single motor M configured to be selectively connected to the telescopic mechanism 3 or the tilt mechanism 4, the steering wheel 100 of which an operation position is adjustable by the operation of the telescopic mechanism 3 or the tilt mechanism 4, the drive mechanism 5 adjusting the output torque of the motor M to transmit the output torque to the telescopic threaded shaft 33 and the tilt threaded shaft 43, the telescopic threaded shaft 33 being configured to drive the telescopic mechanism 3, the tilt threaded shaft 43 being configured to drive the tilt mechanism 4 and arranged in parallel with the telescopic threaded shaft 33, and the connecting-disconnecting mechanism 6 including the first clutch mechanism 6a configured to connect and disconnect the drive mechanism 5 to and from the tilt threaded shaft 43, and the second clutch mechanism 6b configured to connect and disconnect the drive mechanism 5 to and from the telescopic threaded shaft 33, the connecting-disconnecting mechanism 6 bringing one of the first clutch mechanism 6a and the second clutch mechanism 6b in the connected state to the drive mechanism 5 and bringing the other of the first clutch mechanism 6a and the second clutch mechanism 6b in the disconnected state from the drive mechanism 5. The drive mechanism 5 and the connecting-disconnecting mechanism 6 constitute the single power connecting-disconnecting unit D.

According to the aforementioned configuration of the steering apparatus of the embodiment, the single motor M may selectively connect to the telescopic mechanism 3 or the tilt mechanism 4. In addition, the telescopic threaded shaft 33 and the tilt threaded shaft 43 are arranged in parallel with each other; therefore, the whole size of the steering apparatus according to the embodiment may be minimized. Moreover, the connection of the motor M to the telescopic mechanism 3 and the connection of the motor M to the tilt mechanism 4 may be switched within the single power connecting-disconnecting unit D. Components (for example, the telescopic threaded shaft 33, the tilt threaded shaft 43, and the like) other than the power connecting-disconnecting unit D may be applied to known electric tilt and telescopic mechanisms, resulting in a cost reduction.

According to the aforementioned embodiment, the first clutch mechanism 6a and the second clutch mechanism 6b include the first and second clutch members 61, 62. In order to bring one of the tilt threaded shaft 43 and the telescopic threaded shaft 33 in the connected state to the drive mechanism 5, the first and second clutch members 61, 62 are mutually axially moved to transmit the output torque to the one of the tilt threaded shaft 43 and the telescopic threaded shaft 33.

According to the aforementioned configuration, the drive mechanism 5 may easily and surely connect to and disconnect from one of the tilt threaded shaft 43 and the telescopic threaded shaft 33 (one of the tilt mechanism 4 and the telescopic mechanism 3).

According to the aforementioned embodiment, the connecting-disconnecting mechanism 6 includes the connecting-disconnecting member 63 bringing one of the first clutch mechanism 6a and the second clutch mechanism 6b in the connected state to the drive mechanism 5 when one of the first clutch member 61 and the second clutch member 62 is moved in the predetermined direction, the connecting-disconnecting member 63 bringing the other of the first clutch mechanism 6a and the second clutch mechanism 6b in the disconnected state from the drive mechanism 5 when the other of the first clutch member 61 and the second clutch member 62 is moved in the opposite direction from the predetermined direction.

According to the aforementioned embodiment, the connecting-disconnecting member 63 is the lever member 63 provided so that the intermediate portion of the lever member 63 is pivotally supported within the power connecting-disconnecting unit D and so that first and second end portions of the lever member 63 engage with the first clutch member 61 and the second clutch member 62, respectively.

According to the aforementioned embodiment, the connecting-disconnecting mechanism 6 includes the manual operation mechanism connecting to the lever member 63 to manually rotate the lever member 63.

According to the aforementioned configuration, the connecting-disconnecting member 63 is formed by the lever member 63; thereby, the lever member 63 is manually rotated to easily connect and disconnect the drive mechanism 5 to and from the telescopic mechanism 3 or the tilt mechanism 4.

According to the aforementioned embodiment, the connecting-disconnecting mechanism 6 includes the electrical operation mechanism connecting to the lever member 63 to electrically rotate the lever member 63.

According to the aforementioned embodiment, the lever member 63 is electrically rotated to connect and disconnect the drive mechanism 5 to and from the telescopic mechanism 3 or the tilt mechanism 4.

According to the aforementioned embodiment, the connecting-disconnecting mechanism 6 includes the compression spring 64 normally applying the biasing force to one of the first clutch member 61 and the second clutch member 62 to bring one of the first clutch mechanism 6a and the second clutch mechanism 6b to be in the connected state and to bring the other of the first clutch mechanism 6a and the second clutch mechanism 6b to be in the disconnected state.

According to the aforementioned configuration, in a case where the steering apparatus in the normal state, one of the first clutch mechanism 6a and the second clutch mechanism 6b may be maintained in the connected state to the drive mechanism 5; therefore, the connecting-disconnecting mechanism 6 may be further simply configured.

According to the aforementioned embodiment, the power connecting-disconnecting unit D is configured by the housing 60 accommodating at least the first and second clutch members 61, 62, the first and second worm wheels 51, 52 configuring the drive mechanism 5 and being connectable and disconnectable relative to the first and second clutch members 61, 62, respectively, and the worm shaft 50 engaging with the first and second worm wheels 51, 52 to transmit the output torque of the motor M to the first and second clutch members 61, 62, respectively.

Thus, the single motor M may selectively connect to the telescopic mechanism 3 or the tilt mechanism 4 by a simple configuration. In addition, the whole size of the steering apparatus according to the embodiment may be minimized.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:
1. A steering apparatus for vehicle, comprising:
a steering column supported by a vehicle body to be slidable in a font-rear direction of the vehicle and being pivotal relative to the vehicle body;
a single electric motor configured to be selectively connected to a telescopic mechanism or a tilt mechanism;
a steering wheel of which an operation position is adjustable by an operation of the telescopic mechanism or the tilt mechanism;
a drive mechanism adjusting an output torque of the electric motor to transmit the output torque to a telescopic threaded shaft and a tilt threaded shaft, the telescopic threaded shaft being configured to drive the telescopic mechanism, the tilt threaded shaft being configured to drive the tilt mechanism and arranged in parallel with the telescopic threaded shaft;
a connecting-disconnecting mechanism including a first clutch mechanism configured to connect and disconnect the drive mechanism to and from the tilt threaded shaft, and a second clutch mechanism configured to connect and disconnect the drive mechanism to and from the telescopic threaded shaft, the connecting-disconnecting mechanism bringing one of the first clutch mechanism and the second clutch mechanism in a connected state to the drive mechanism and bringing the other of the first clutch mechanism and the second clutch mechanism in a disconnected state from the drive mechanism;

wherein the drive mechanism and the connecting-disconnecting mechanism constitute a single power connecting-disconnecting unit;

wherein the first clutch mechanism and the second clutch mechanism include first and second clutch members;

wherein in order to bring one of the tilt threaded shaft and the telescopic threaded shaft in a connected state to the drive mechanism, the first and second clutch members are mutually axially moved to transmit the output torque to the one of the tilt threaded shaft and the telescopic threaded shaft;

wherein the connecting-disconnecting mechanism includes a connecting-disconnecting member bringing one of the first clutch mechanism and the second clutch mechanism in the connected state to the drive mechanism when one of the first clutch member and the second clutch member is moved in a predetermined direction, the connecting-disconnecting member bringing the other of the first clutch mechanism and the second clutch mechanism in the disconnected state from the drive mechanism when the other of the first clutch member and the second clutch member is moved in an opposite direction from the predetermined direction; and wherein the connecting-disconnecting member is a lever member provided so that an intermediate portion of the lever member is pivotally supported within the power connecting-disconnecting unit and so that first and second end portions of the lever member engage with the first clutch member and the second clutch member, respectively.

2. The steering apparatus according to claim 1, wherein the connecting-disconnecting mechanism includes a manual operation mechanism connecting to the lever member to manually rotate the lever member.

3. The steering apparatus according to claim 1, wherein the connecting-disconnecting mechanism includes an electrical operation mechanism connecting to the lever member to electrically rotate the lever member.

4. The steering apparatus according to claim 1, wherein the connecting-disconnecting mechanism includes a biasing member normally applying a biasing force to one of the first clutch member and the second clutch member to bring one of the first clutch mechanism and the second clutch mechanism to be in the connected state and to bring the other of the first clutch mechanism and the second clutch mechanism to be in the disconnected state.

5. The steering apparatus according to claim 1, wherein the power connecting-disconnecting unit is configured by a housing accommodating at least the first and second clutch members, first and second worm wheels configuring the drive mechanism and being connectable and disconnectable relative to the first and second clutch members, respectively, and an output shaft engaging with the first and second worm wheels to transmit the output torque of the electric motor to the first and second clutch members, respectively.

* * * * *